(12) United States Patent
Fritz et al.

(10) Patent No.: US 9,212,699 B2
(45) Date of Patent: Dec. 15, 2015

(54) SEALING ASSEMBLY FOR A ROLLING BEARING

(75) Inventors: Harry Fritz, Wendelstein (DE); Claus Guckenberger, Erlangen (DE); Stephan Herbst, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1065 days.

(21) Appl. No.: 13/320,296

(22) PCT Filed: May 10, 2010

(86) PCT No.: PCT/EP2010/056324
§ 371 (c)(1),
(2), (4) Date: Dec. 22, 2011

(87) PCT Pub. No.: WO2010/130669
PCT Pub. Date: Nov. 18, 2010

(65) Prior Publication Data
US 2012/0098205 A1    Apr. 26, 2012

(30) Foreign Application Priority Data
May 15, 2009   (DE) .................. 10 2009 021 470

(51) Int. Cl.
*F16J 15/447*   (2006.01)
*F16J 15/16*   (2006.01)
*F16C 33/80*   (2006.01)
*F16C 33/78*   (2006.01)

(52) U.S. Cl.
CPC ............. *F16C 33/782* (2013.01); *F16C 33/785* (2013.01); *F16C 33/80* (2013.01)

(58) Field of Classification Search
CPC ....... F16C 33/782; F16C 33/785; F16C 33/80
USPC ........... 277/409, 411, 412, 421; 384/480, 488
See application file for complete search history.

(56) References Cited

U.S. PATENT DOCUMENTS

| | | | | |
|---|---|---|---|---|
| 3,283,634 A | * | 11/1966 | Lodjic | 83/333 |
| 3,350,148 A | * | 10/1967 | Sanguinetti et al. | 384/488 |
| 5,242,229 A | * | 9/1993 | McLarty | 384/484 |
| 5,470,158 A | | 11/1995 | McLarty et al. | |
| 5,722,167 A | * | 3/1998 | Duchamp et al. | 29/898.061 |
| 6,263,752 B1 | * | 7/2001 | Tanaka | 74/467 |
| 6,471,211 B1 | * | 10/2002 | Garnett et al. | 277/351 |
| 2007/0154124 A1 | * | 7/2007 | Inoue et al. | 384/488 |
| 2008/0247696 A1 | * | 10/2008 | Winkelmann et al. | 384/482 |

FOREIGN PATENT DOCUMENTS

| | | |
|---|---|---|
| DE | 47076 A2 | 7/1966 |
| NL | 9401721 A * | 6/1996 |

* cited by examiner

*Primary Examiner* — Vishal Patel
*Assistant Examiner* — Stacy Warren
(74) *Attorney, Agent, or Firm* — Simpson & Simpson, PLLC

(57) ABSTRACT

A sealing assembly for a rolling bearing. The sealing assembly has at least one cover element for covering a bearing gap along a cover plane. The cover element has a securing section, a sealing collar, a base part connecting the securing section and the sealing collar, and at least one sealing surface provided on the sealing collar for non-contact sealing. At a starting section the sealing collar extends from the base part diagonally toward the inner side of the cover element facing the bearing interior and at an end section the sealing collar extends from the inside toward the outer side of the cover element facing away from the bearing interior. At the same time, the sealing collar forms a sealing surface substantially perpendicular to the cover plane and at the end of the end section at least one edge impeding the inflow of impurities into the bearing interior.

2 Claims, 3 Drawing Sheets

SEALING ASSEMBLY FOR A ROLLING BEARING

CROSS-REFERENCE TO RELATED APPLICATIONS

This application is a 371 of PCT/EP2010/056324 filed May 10, 2010, which in turn claims the priority of DE 10 2009 021 470.4 filed May 15, 2009. The priority of both applications is hereby claimed and both applications are incorporated by reference herein.

FIELD OF THE INVENTION

The invention relates to a sealing assembly for a rolling bearing. The sealing assembly has at least one covering element for covering a bearing gap along a covering plane, and the covering element has, for securing purposes, a securing section, and a sealing collar, a base part connecting the securing section and the sealing collar, and at least one sealing surface on the sealing collar for non-contact sealing.

BACKGROUND OF THE INVENTION

A sealing assembly of this kind is known from DD 47 076. In this document, a covering disk produced integrally from sheet metal is arranged so as to seal off a bearing gap formed between two bearing rings of a rolling bearing. The covering disk is clamped against the shoulder of the outer bearing ring at the outer edge. A border running at a right angle to the disk plane is formed radially on the inside on a radial disk part. This border forms a non-contact seal with the inner bearing ring at a sealing gap. The disadvantage with this configuration is that the border extends in the direction of the bearing interior and has a bending radius in the region of the outer end of the sealing gap. This gives rise to a kind of suction funnel between the bending radius of the covering disk and the radially opposite shoulder of the inner bearing ring, promoting the entry of dust, dirt and moisture from the environment into the sealing gap. Moreover, the funnel effect is intensified by a machined chamfer formed on the edge of the shoulder of the inner bearing ring. In this arrangement, bearing grease from the bearing interior can furthermore escape outward at the sealing gap.

SUMMARY OF THE INVENTION

Therefore, the invention relates broadly to providing a sealing assembly of the abovementioned type in which the sealing effect is improved.

According to the invention, at least one covering element, which covers the bearing gap along a covering plane, is provided. In this arrangement, the covering element has an inner side facing the bearing interior to be sealed off and an outer side facing away from said inner side and from the bearing interior. In its end section, the sealing collar which, according to the invention, is provided for non-contact sealing on the covering element, extends from the inner side in the direction of the outer side and forms a sealing surface which is perpendicular or approximately perpendicular to the covering plane of the covering element and, together with the rolling bearing, forms a sealing gap. At the same time, the end section has, at the end thereof, an edge impeding the entry of impurities into the sealing gap. This prevents the formation of a suction funnel at the sealing gap, increases the sealing effect and reduces the entry of impurities, such as dirt, dust and moisture from the environment, into the sealing gap. Since, in its initial section, the sealing collar furthermore runs obliquely from a base part in the direction of the inner side, the bearing grease flung out of the bearing interior can be collected on the inner wall thereof and fed back into the bearing interior along said wall. A bearing grease deflector is thereby formed on the sealing collar, preventing bearing grease from escaping from the bearing interior at the sealing gap and sealing off the interior of the bearing from the outside. In this way, the sealing collar performs a dual sealing function at a sealing gap. It seals off the bearing from the outside at the bearing interior and, at the same time, seals off the bearing toward the inside, at the outer end thereof, relative to the environment, and does so in a non-contact manner.

An interfering edge is formed in a simple manner at the end of the end section by the meeting of the sealing surface of the end section and of the outer circumferential surface thereof. This can be formed by the material thickness side of the end section, for example, which arises as a cut surface during the severing of the material in the production process. The edge interferes with the entry of the mixture of air, dust, dirt and/or moisture from the environment into the sealing gap. If the sealing surface and the outward-oriented circumferential surface meet at an acute angle at the edge, this edge is particularly sharp-edged and a powerful interfering effect is achieved at the sealing gap. The sealing surface and the outer circumferential surface preferably form an angle of 90° or less than 90° at the edge. It is advantageous if the end section forms, at the end thereof, a region which projects into the sealing gap, at which the sealing surface and the outer circumferential surface run toward one another at an acute angle and form a sharp edge. It would also be conceivable to configure the abovementioned region as a screen projecting into the sealing gap at the end of the end section.

According to a particularly preferred embodiment of the invention, the sealing collar is approximately U-shaped in section, with a U base which points in the direction of the inner side of the covering element. In this arrangement, the initial section thereof forms the first U leg and the end section thereof forms the second U leg. The first U leg and the U base run at a right angle or approximately at a right angle to one another, while the second U leg deviates from the strict U shape through its somewhat shallower profile, which opens up the U slightly. The central section, which forms the U base, connects the initial section and the end section. This gives rise to two sealing surfaces on the sealing collar, namely a sealing surface on the second U leg and a further sealing surface on the U base.

According to a preferred embodiment of the invention, the U base, which adjoins the first U leg at a right angle or approximately at a right angle and runs obliquely in the direction of the outer side of the covering element, forms a sealing surface which is aligned in the direction of the inner side and slopes obliquely to the covering plane. The second U leg, which adjoins the U base, runs at a right angle to the covering plane in the direction of the outer side of the covering element. This has a sealing surface perpendicular to the covering plane of the covering element and simultaneously forms an obtuse angle with the U base.

These two sealing surfaces are arranged at an obtuse angle to one another. This enables the sealing collar to reach into a corresponding contour, of obtuse-angled cross section, on the rolling bearing, e.g. an undercut on the circumference of one of the bearing rings of the rolling bearing, wherein its two sealing surfaces, which are aligned obliquely to one another, follow this contour without making contact. This gives rise to a double gap seal between these two sealing surfaces and the obtuse-angled contour on the rolling bearing. However, it would also be conceivable for a single gap seal to be formed between one of the sealing surfaces on the sealing collar and the rolling bearing; in particular, it is possible for a sealing gap to be formed between the radial sealing surface on the second U leg and a bearing ring embodied with a smooth circumference and without a contour.

According to another particularly preferred embodiment of the invention, the central section together with the end section forms a profile which is right-angled in section. If the central section runs parallel to the covering plane of the covering element, it produces a sealing surface parallel to the covering plane.

The end section preferably extends in the direction of the outer side of the covering element and is arranged at a right angle to the covering plane and, in the process, forms a sealing surface perpendicular to the covering plane.

Accordingly, the two sealing surfaces are arranged at a right angle to one another. This enables the sealing collar to reach into a contour of right-angled cross section on the rolling bearing, e.g. a right-angled annular offset or a right-angled step on the circumference of one of the bearing rings, wherein its two sealing surfaces aligned at a right angle to one another follow the right-angled contour without making contact. This gives rise to a double gap seal between these two sealing surfaces and the right-angled contour on the rolling bearing.

It would also be conceivable for the central section together with the end section to form an L-shaped profile which is obtuse-angled in section. This enables the sealing collar to reach into an obtuse-angled offset or into an obtuse-angled step on the rolling bearing, for example, without making contact and to produce a double gap seal.

According to another particularly preferred embodiment of the invention, the part of the sealing collar which adjoins the initial section is of Z-shaped design in section. In this case, the central section of the sealing collar forms the first and the second Z leg and the end section of the sealing collar forms the third Z leg, which is parallel to the first Z leg. The second Z leg connects the outer end of the first Z leg, the end facing the outer side of the covering element, to the inner end of the third Z leg, the end facing the inner side. In this arrangement, the first Z leg and the third Z leg run at a right angle to the covering plane and each form a sealing surface perpendicular to the latter. The second Z leg adjoins the outer end of the first Z leg at an acute angle and, in the process, forms a sealing surface which is aligned in the direction of the inner side and slopes obliquely to the covering plane. As a result, the Z-shaped profile of the sealing collar has three sealing surfaces. This enables the sealing collar to reach into a Z-shaped contour on the rolling bearing, e.g. an annular offset or an annular step, wherein its three sealing surfaces follow this contour without making contact. This gives rise to a triple gap seal between these sealing surfaces and the Z-shaped contour of the rolling bearing, the sealing gaps of this gap seal being arranged at an acute angle to one another and producing a powerful labyrinth effect. However, a right-angled or obtuse-angled alignment of the second Z leg relative to the two other Z legs and hence a right-angled or obtuse-angled alignment of the sealing gaps relative to one another is also conceivable.

In a preferred embodiment of the invention, the covering element is of integral design and is simple to produce and fit. When designed as a sheet metal part, the covering element is particularly simple and economical to produce by means of sheet metal working methods, in particular in a non-cutting manner by deep drawing. At the same time, embodiment in sheet metal ensures both high thermal stability and also high resistance to chemical influences.

On the bearing side, the covering element can be connected in the securing section to the outer bearing ring or to the inner bearing ring, and the sealing collar can accordingly form at least one sealing gap with the inner or the outer bearing ring at at least one sealing surface. The covering element is preferably connected to the outer bearing ring and forms at least one sealing gap with the inner bearing ring at the sealing collar, at at least one sealing surface. Since the diameter of the inner bearing ring is less than the diameter of the outer bearing ring in a radial rolling bearing, the sealing gap and the sealing surface on the sealing collar have a shorter circumferential length in comparison with the alternative arrangement, thereby reducing the risk of seal failures.

It would also be conceivable for the sealing assembly according to the invention to be embodied as a shaft/housing seal. For example, a housing can perform the function of an outer bearing ring and a shaft can perform the function of an inner bearing ring, wherein races, on which the rolling elements are guided, are formed on the housing and on the shaft. The housing, the shaft and the rolling elements guided therebetween thus form a rolling bearing assembly, by means of which the housing can be supported on the shaft or the shaft can be supported on the housing. In this arrangement, the covering element can be connected either to the housing or to the shaft, and the sealing collar can form at least one sealing gap in the manner described above with the shaft or the housing for non-contact sealing.

BRIEF DESCRIPTION OF THE DRAWINGS

Further features of the invention will emerge from the following description and from the attached drawings, in which a number of embodiments of the invention are illustrated in simplified form and in which.

DETAILED DESCRIPTION OF THE INVENTION

Figure 1:
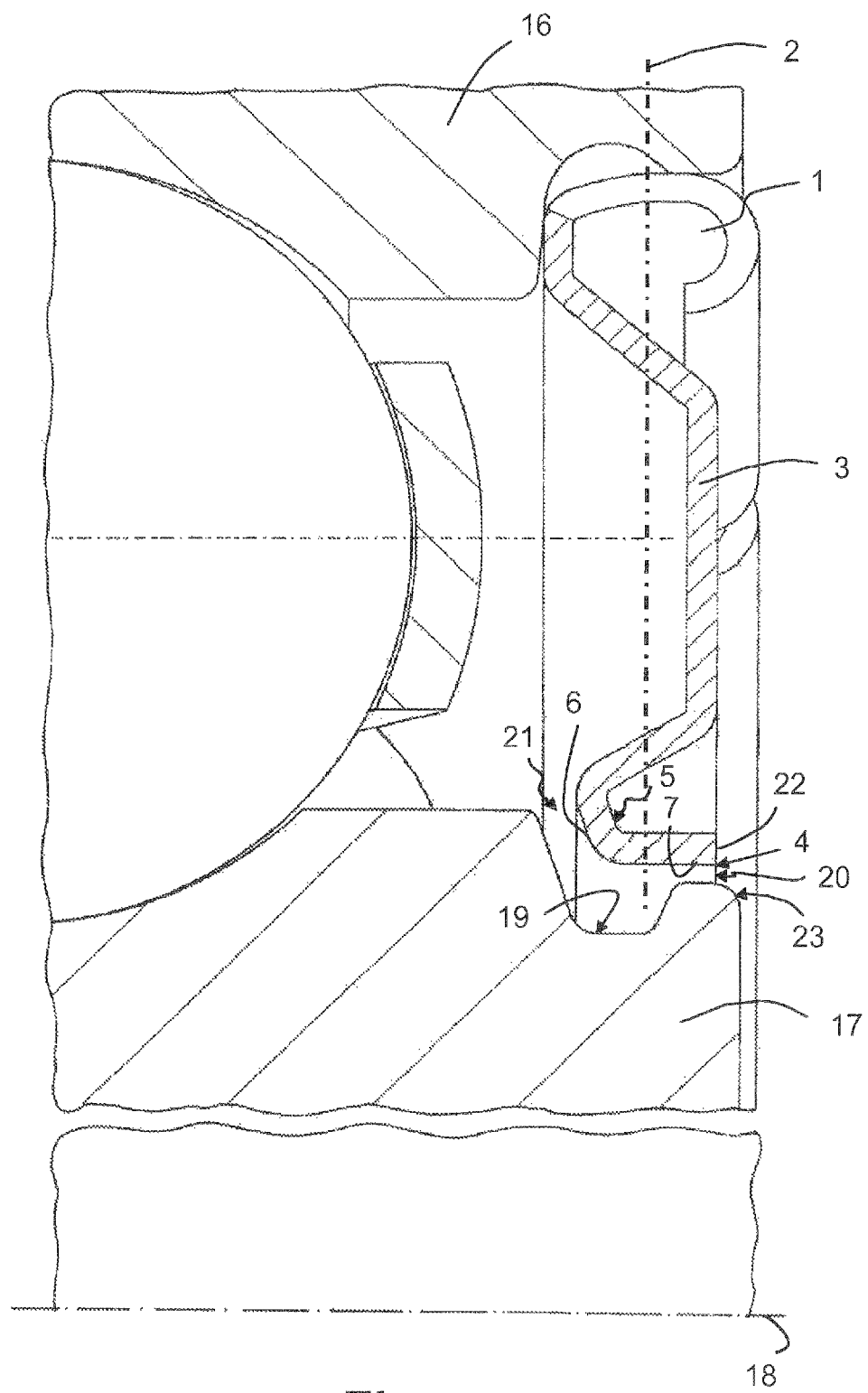
FIG. 1 shows a partial section of a rolling bearing with a first embodiment of a sealing assembly according to the invention.

FIG. 1 illustrates a radial deep-groove ball bearing in a partial section. The rolling elements, which are guided in a rolling element cage, each run around between an outer bearing ring 16 and an inner bearing ring 17 on the races, which are embodied as race grooves. At the axial outer sides of the rolling bearing, the bearing gap formed between the bearing rings 16, 17 is in each case covered by a covering element 1, which, according to the invention, runs around in a ring, along a covering plane 2 which is perpendicular to the rolling bearing axis 18 and runs in the radial direction. In this arrangement, the covering element 1 has an inner side, which axially faces the bearing interior to be sealed off, and an outer side, which faces away axially from said inner side and from the bearing interior. The covering element 1 is designed as a cover formed integrally of sheet metal. This cover has a disk-shaped base part 3, which extends in the radial direction in the assembled condition and the disk plane of which runs parallel to the covering plane 2. Adjoining integrally, starting from the base part 3, are a securing section radially on the outside and a sealing collar radially on the inside, each of which runs around in a ring. The securing section is formed by a leg which is angled obliquely in the direction of the bearing interior and adjoining which there is a securing collar. The securing collar is bent outward in a head shape. To secure the covering element 1, it engages nonpositively and/or positively, being caulked in or spread apart for example, in an undercut of complementary design in the rim of the outer bearing ring 16. The sealing collar, which is arranged radially on the inside on the base part 3, seals off the bearing gap from the inner bearing ring 17 without making contact. The sealing collar consists of three sections directly adjoining one another: an initial section, a central section and an end section, which together form a profile 5 which is approximately U-shaped in section. In this arrangement, the U base faces the hearing interior. The initial section, which forms the first U leg facing the bearing interior, extends radially inward and obliquely inward on the radial inside of the base part 3. The central section, which forms the U base, adjoins the initial section approximately at a right angle and runs obliquely outward. Finally, the end section, which forms the second U leg facing the inner hearing inner ring 17 and directly adjoins the central section, runs axially outward and is aligned perpendicularly to the covering plane 2 and to the disk plane of the base part 3. In this arrangement, the first U leg runs approximately at a right angle to the U base, while the second U leg deviates from the strict U shape through its somewhat shallower profile, which opens up the U slightly. The central section connects the initial section and the end section.

An undercut 19 is formed in the rim of the inner bearing ring 17. The inner side wall of said undercut, which faces the hearing interior, runs obliquely outward from the inner shoulder of the undercut on the outer circumference of the inner bearing inner ring 17. In the axially outward direction, the undercut 19 is bounded by its outer shoulder in the edge region of the inner bearing ring 17, said shoulder having a reduced outside diameter as compared with the inner shoulder. The side wall and the outer circumference of the outer shoulder are arranged at an obtuse angle to one another and form a contour of obtuse-angled cross section on the inner bearing ring 17.

The sealing collar reaches into the undercut 19 by means of its U base and its second U leg without making contact. In this arrangement, the U base runs parallel to the inner side wall of the undercut 18 and at a distance therefrom. The second U leg, which directly adjoins the U base, runs outward in the axial direction, coaxially with and at a radial distance from the inner bearing ring 17. At the same time, the second U leg forms, on its inner side facing the inner bearing ring 17, a sealing surface 7 on the sealing collar which is aligned radially with respect to said inner bearing ring, is perpendicular with respect to the covering plane 2 and the disk plane of the base part 3 and runs around in a ring. This scaling surface is arranged coaxially with and at a uniform distance from the outer circumference of the outer shoulder of the undercut. This gives rise to a narrow sealing gap 20 between the second U leg and the outer shoulder of the undercut in the edge region of the inner bearing ring 17. A sealing surface 6 which slopes obliquely to the covering plane 2 and to the disk plane of the base part 3 and is aligned toward the inner side wall of the undercut 19 on the inner bearing ring 17 is formed on the U base, on the inner side thereof facing this side wall, parallel to and at a distance from said side wall. At the same time, the sealing surface 6 runs at a uniform distance from the side wall.

This gives rise to a further sealing gap 21, arranged at an obtuse angle to the sealing gap 20, between the U base and the side wall. The sealing surfaces 6, 7 of the sealing collar thus follow the contour of the undercut 19 at the inner side wall thereof and at the outer shoulder thereof without making contact and the sealing collar forms a double gap seal with the inner bearing ring 17 at the undercut 19.

At the end of the second U leg, the outer circumferential surface 22 is formed by the axially aligned material thickness side thereof, which arises as a cut surface during the severing of the material in the production process, for example. This is arranged so as to lie in the same plane as the outer circumferential surface of the disk-shaped base part 3. The material thickness side and the radial sealing surface 7, facing the inner bearing ring 17, of the second U leg meet at a right angle at the end of said leg and form a sharp edge 4 which runs around in a ring. This sharp edge is arranged at the outer end of the sealing gap 20, on the sealing surface 7 of the second U leg, radially opposite the rim of the inner bearing inner ring 17, and impedes the entry of the mixture of air, dust, dirt and/or moisture from the environment into the sealing gap 20. At the same time, the edge 4 also provides protection from other environmental influences and, in particular, can also hold off spray. In this arrangement, a machined chamfer 23 formed on the edge of the rim lies outside the sealing gap 20. The radial sealing surface 7 of the second U leg runs axially outward in the region of the edge 4 at a constant radial distance from the outer circumference of the inner hearing ring 17.

Starting from the base part 3, the initial section of the sealing collar that forms the first U leg, extends obliquely in the direction of the bearing interior. At the same time, this initial section is aligned approximately at a right angle to the inner side wall of the undercut 19 and runs toward the edge thereof on the inner shoulder at the outer circumference of the inner bearing ring 17. At its end, the first U leg lies obliquely opposite the inner shoulder of the undercut 19 and, with said undercut, forms the inner end of the sealing gap 21 formed between the U base and the inner side wall, said end facing the bearing interior. The disk-shaped base part 3 and the leg of the securing section, said leg being connected to the base part radially on the outside, and the first U leg of the sealing collar, which is angled radially inward, form the axially outer boundary of a space which serves as a bearing grease reservoir. In this arrangement, the first U leg, which extends obliquely in the direction of the hearing interior, serves as a bearing grease deflector. This collects the bearing grease flung off by the bearing at its inner surface facing the bearing interior, and guides it back obliquely inward in the direction of the inner bearing ring 17 and into the hearing interior. In this way, the bearing grease can be guided back on the sealing collar along the bearing grease deflector, past the inner end of the sealing gap 21, and into the bearing interior and an escape of bearing grease at the sealing gap 21 can be reliably prevented.

Figure 2:
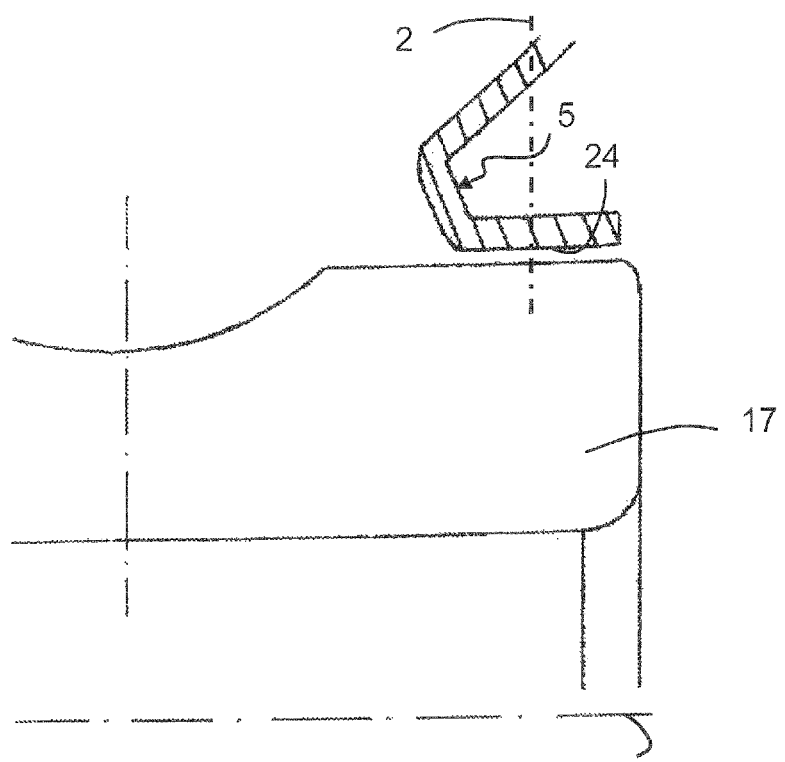
FIG. 2 shows a partial section of the inner bearing ring and of the sealing collar with a second embodiment of the sealing assembly.

FIGS. 2 to 5 each show schematically a further embodiment of a sealing assembly according to the invention in a partial section of the inner bearing ring 17 and of the sealing collar. FIG. 2 shows a second embodiment, in which the sealing collar from FIG. 1, which is configured as an approximately U-shaped profile 5, forms a single gap seal with an inner bearing ring 17 embodied in such a way as to be smooth at its rim, without an undercut. In this arrangement, the sealing collar extends with its second U leg perpendicular to the covering plane 2 and to the disk plane of the base part 3, which is parallel to said covering plane, axially outward, coaxially with the inner bearing ring 17, and, on its side facing the inner bearing ring 17, forms a radial sealing surface 24 aligned radially with respect to said bearing ring and formed at a uniform distance to the outer circumference thereof. A long sealing gap, which seals off the bearing both from the inside and from the outside, is formed between the radial sealing surface 24 and the inner bearing ring 17, which is embodied with a smooth outer circumference.

Figure 3:
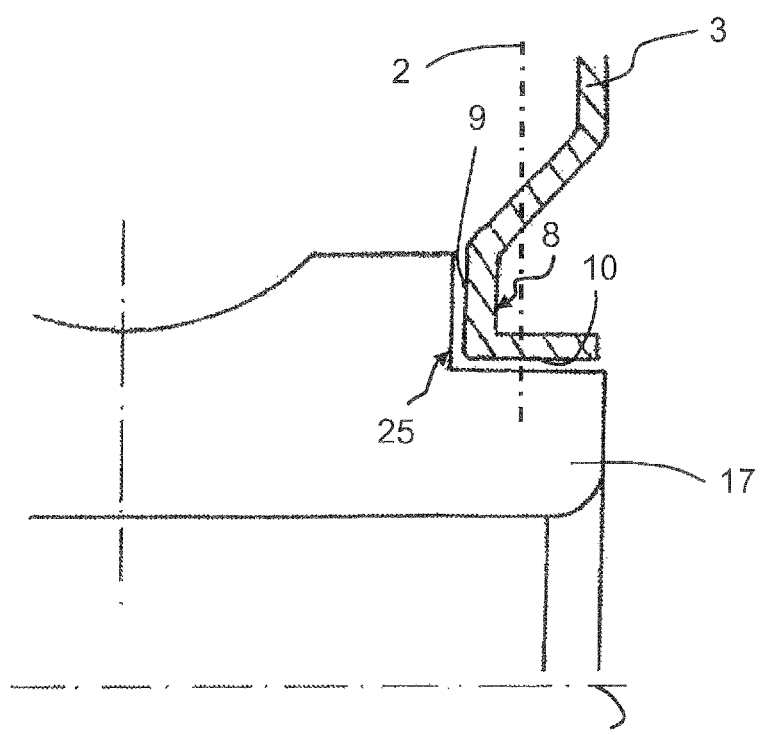
FIG. 3 shows a partial section of the inner bearing ring and of the sealing collar with a third embodiment of the sealing assembly.
Figure 4:
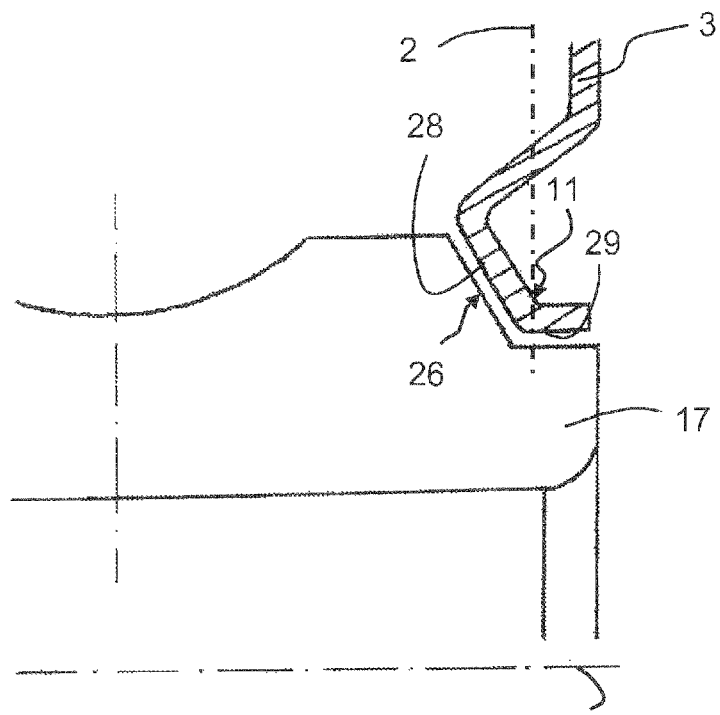
FIG. 4 shows a partial section of the inner bearing ring and of the sealing collar with a fourth embodiment of the sealing assembly.
Figure 5:
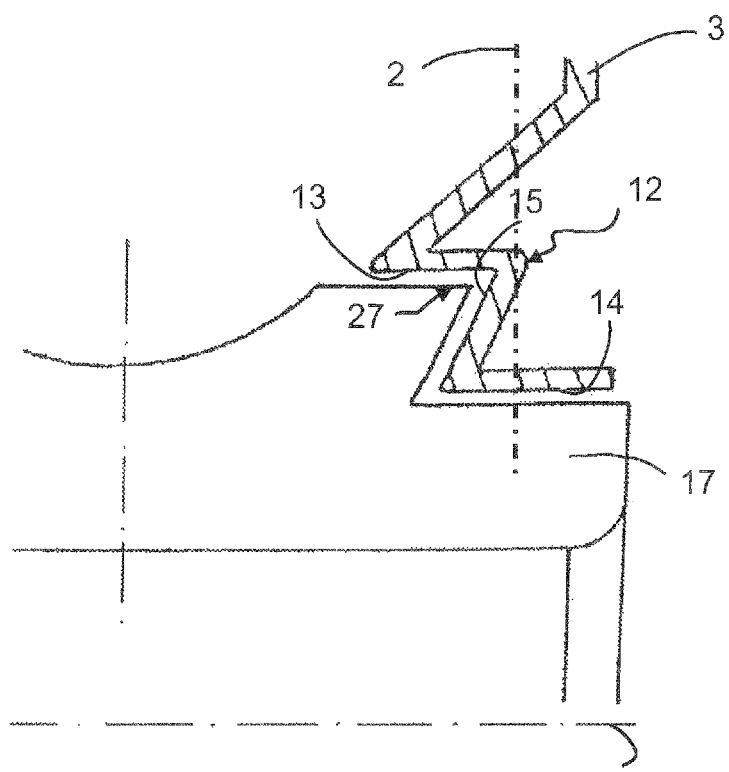
FIG. 5 shows a partial section of the inner bearing ring and of the sealing collar with a fifth embodiment of the sealing assembly.

FIGS. 3 to 5 show further variants of the invention, in which that part of the sealing collar which adjoins the initial section, namely the central section and the end section, is matched to the contour of an annular offset 25, 26, 27 formed on the outer circumference of the inner bearing ring 17. On the outer circumference of the inner bearing ring 17, the annular offset has an inner shoulder facing the bearing interior and a side wall adjoining said shoulder. At its outer shoulder, which is offset with a reduced outside diameter relative to its inner shoulder and runs from the side wall, coaxially with the rolling bearing axis 18, the annular offset extends as far as the outer edge of the inner bearing ring 17.

FIGS. 3 and 4 show a third and a fourth embodiment. The initial section of the sealing collar runs obliquely from the base part 3 in the direction of the bearing interior and is aligned with the outer edge of the inner shoulder of the annular offset on the outer circumference of the inner bearing ring 17.

In FIG. 3, adjoining the initial section, the central section then extends in the radial direction, parallel to the covering plane 2 and to the disk plane of the base part 3. The end section adjoins the central section at a right angle. In this variant, the central section and the end section form a profile 8 of right-angled cross section on the sealing collar. With its right-angled profile 8, said collar reaches into a right-angled annular offset 25, in which the right angle is formed by the side wall and the outer shoulder, without making contact. In this arrangement, the central section is arranged parallel to and at a distance from the axially aligned side wall of the annular offset 25, said side wall running perpendicularly to the rolling bearing axis 18, and forms on the sealing collar an axial sealing surface 9 which is at a uniform distance from this side wall and runs parallel to the covering plane 2 and to the disk plane of the base part 3. The end section, which runs coaxially with and at a radial distance from the outer shoulder of the annular offset 25 is, at the same time, arranged at a right angle to the covering plane 2 and to the disk plane of the base part 3 and, on its inner side facing the outer shoulder of the annular offset 25, has a sealing surface 10 aligned radially to this shoulder. This sealing surface is arranged coaxially with and at a uniform distance from the outer circumference of the outer shoulder of the annular offset 25 and runs perpendicularly to the covering plane 2 and to the disk plane of the base part 3. As a result, the sealing surfaces 9, 10 on the right-angled profile 8 of the sealing collar follow the right-angled contour of the annular offset 25 without making contact. This gives rise to a double gap seal between the sealing collar and the annular offset 25, the sealing gaps of said seal being arranged at a right angle to one another.

In FIG. 4, the central section adjoins the initial section approximately at a right angle. The central section and the end section adjoining the latter toward the outside form an obtuse angle and, in this way, form an L-shaped profile 11 of obtuse-angled cross section on the sealing collar. In this arrangement, the central section forms the longer L leg and the end section forms the shorter L leg. With this profile 11, the sealing collar reaches into an obtuse-angled annular offset 26 without making contact. Starting from the inner shoulder of the annular offset, the side wall of said offset runs outward obliquely to the rolling bearing axis 18 and forms an obtuse angle with the outer shoulder of said offset. In this arrangement, the longer L leg is arranged parallel to and at a distance from the outward-sloping side wall of the annular offset 26, while the shorter L leg runs coaxially with and at a radial distance from the outer shoulder of the annular offset 26 on the inner bearing ring 17. As a result, the longer L leg forms a sealing surface 28 which is parallel to and at a uniform distance from this side wall and extends obliquely inward while facing the inner bearing ring 17, while the shorter L leg has, on its inner side facing the outer shoulder of the annular offset 26, a sealing surface 29 aligned radially to this shoulder and arranged coaxially with and at a uniform distance from the outer circumference thereof. This sealing surface runs perpendicularly to the covering plane 2 and to the disk plane of the base part 3. As a result, the sealing surfaces 28, 29 on the obtuse-angled L profile 11 of the sealing collar follow the obtuse-angled contour of the annular offset 26 at the side wall thereof and at the outer shoulder thereof. This gives rise to a double gap seal between the sealing collar and the annular offset 26, the sealing gaps of said seal being arranged at an obtuse angle to one another.

In the fifth embodiment, which is shown in FIG. 5, that part of the sealing collar which adjoins the initial section is Z-shaped in section. In this arrangement, the central section and the end section form a profile 12 of Z-shaped cross section on the sealing collar. The central section of the sealing collar forms the first Z leg and the second Z leg, wherein the first Z leg directly adjoins the initial section, while the end section of the sealing collar forms the third Z leg parallel to the. In this arrangement, the second Z leg adjoins the first Z leg at an acute angle, runs obliquely inward and connects the outer end of the first Z leg to the inner end of the third Z leg, said end facing the bearing interior. Formed on the rim of the inner bearing ring 17 is an annular offset 27, the side wall of which runs inward from the inner shoulder thereof, obliquely to the rolling bearing axis 18, and forms an acute angle with the outer and the inner shoulder thereof. With its Z-shaped profile 12, the sealing collar follows the contour of Z-shaped cross section formed on the annular offset 27 by the shoulders and side wall thereof. In this arrangement, the first Z leg extends coaxially with the inner shoulder, and the third Z leg extends coaxially with the outer shoulder of the annular offset 27. At their inner sides facing the inner and outer shoulders respectively of the annular offset 27, the first and third Z legs each form a sealing surface 13, 14, aligned radially to these shoulders, on the sealing collar. These sealing surfaces 13, 14 are each arranged coaxially with and at a uniform distance from the outer circumference of the inner and outer shoulders respectively of the annular offset 27 and perpendicularly to the covering plane 2 and to the disk plane of the base part 3. In this arrangement, the second Z leg extends parallel to and at a distance from the side wall of the annular offset 27 and forms on the sealing collar a sealing surface 15 which is at a uniform distance from this side wall, is aligned in the direction of the bearing interior and slopes obliquely to the covering plane 2 and to the disk plane of the base part 3. As a result, the sealing collar has three sealing surfaces 13, 14, 15 on its Z-shaped profile. These follow the Z-shaped contour of the annular offset 27 without making contact, thereby giving rise to a triple gap seal between the sealing collar and the annular offset 27, the sealing gaps of said seal each adjoining one another at an acute angle.

LIST OF REFERENCE SIGNS

1 Covering Element
2 Covering Plane
3 Base part

4 Edge
5 Profile
6 Sealing Surface
7 sealing Surface
8 Profile
9 Sealing Surface
10 Sealing Surface
11 Profile
12 Profile
13 Sealing Surface
14 Sealing Surface
15 Sealing Surface
16 Bearing Ring
17 Bearing Ring
18 Rolling Bearing Axis
19 Undercut
20 Sealing Gap
21 Sealing Gap
22 Circumferential Surface
23 Machined Chamfer
24 Sealing Surface
25 Annular Offset
26 Annular Offset
27 Annular Offset
28 Sealing Surface
29 Sealing Surface

The invention claimed is:

1. A sealing assembly for a rolling bearing, comprising:
at least one covering element for covering a bearing gap along a covering plane orthogonal to an axis for the rolling bearing, wherein the covering element has, for securing purposes:
a securing section;
a sealing collar;
a base part connecting the securing section and the sealing collar; and
at least one sealing surface on the sealing collar for non-contact sealing,
wherein:
the sealing collar has an initial section that runs obliquely from the base part in a direction of an inner side of the covering element, which faces a bearing interior;
the sealing collar has an end section, radially inward of the initial section, that extends from the inner side in a direction of an outer side of the covering element, which faces away from the bearing interior and forms a first sealing surface substantially perpendicular to the covering plane;
the sealing collar includes a central section:
connecting the initial section with the end section; and,
with a second sealing surface continuous with the first sealing surface and facing the bearing interior; and,
at an end of the end section, the sealing collar forms at least one edge that impedes entry of impurities into the bearing interior;
wherein:
an entirety of the central section is oblique to the covering plane; or,
an entirety of the central section is parallel to the covering plane; and,
wherein:
the sealing collar has a profile with a substantially U-shaped cross-section;
the initial section of the sealing collar forms a first U leg;
the end section of the sealing collar forms a second U leg;
the central section forms a U base, which points toward the inner side of the covering element; the U base adjoins the first U leg at a right angle or substantially at a right angle; and,
the second sealing surface faces the inner side of the covering element and slopes obliquely toward the covering plane.

2. A sealing assembly for a rolling bearing, comprising:
at least one covering element for covering a bearing gap along a covering plane orthogonal to an axis for the rolling bearing, wherein the covering element has, for securing purposes:
a securing section;
a sealing collar;
a base part connecting the securing section and the sealing collar; and
at least one sealing surface on the sealing collar for non-contact sealing,
wherein:
the sealing collar has an initial section that runs obliquely from the base part in a direction of an inner side of the covering element, which faces a bearing interior;
the sealing collar has an end section, radially inward of the initial section, that extends from the inner side in a direction of an outer side of the covering element, which faces away from the bearing interior and forms a first sealing surface substantially perpendicular to the covering plane;
the sealing collar includes a central section:
connecting the initial section with the end section; and,
with a second sealing surface continuous with the first sealing surface and facing the bearing interior; and,
at an end of the end section, the sealing collar forms at least one edge that impedes entry of impurities into the bearing interior;
wherein:
an entirety of the central section is oblique to the covering plane; or,
an entirety of the central section is parallel to the covering plane; and,
wherein the central section together with the end section forms an L profile with an obtuse-angled cross-section.

* * * * *